United States Patent
Jin et al.

(10) Patent No.: US 12,271,600 B2
(45) Date of Patent: Apr. 8, 2025

(54) STORAGE DEVICE, CONTROLLER AND METHOD FOR PERFORMING GLOBAL WEAR-LEVELING

(71) Applicant: SK hynix Inc., Icheon-si (KR)

(72) Inventors: Byoung Min Jin, Icheon-si (KR); Ku Ik Kwon, Icheon-si (KR); Gyu Yeul Hong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 126 days.

(21) Appl. No.: 18/179,781

(22) Filed: Mar. 7, 2023

(65) Prior Publication Data

US 2024/0143187 A1  May 2, 2024

(30) Foreign Application Priority Data

Oct. 28, 2022  (KR) .................. 10-2022-0141239

(51) Int. Cl.
*G06F 3/06* (2006.01)

(52) U.S. Cl.
CPC ............ *G06F 3/0616* (2013.01); *G06F 3/064* (2013.01); *G06F 3/0652* (2013.01); *G06F 3/0683* (2013.01)

(58) Field of Classification Search
None
See application file for complete search history.

(56) References Cited

U.S. PATENT DOCUMENTS

| 7,797,481 | B2 * | 9/2010 | Lee ..................... G06F 12/0246 711/209 |
| 10,860,219 | B2 | 12/2020 | Zhu et al. |
| 2016/0371019 | A1 * | 12/2016 | Kang .................. G06F 12/1009 |
| 2020/0110544 | A1 | 4/2020 | Zhu et al. |
| 2023/0244568 | A1 * | 8/2023 | Miller ................. G06F 11/1076 714/6.2 |

FOREIGN PATENT DOCUMENTS

| KR | 10-2016-0150451 A | 12/2016 |
| KR | 10-2021-0155593 A | 12/2021 |

* cited by examiner

*Primary Examiner* — Baboucarr Faal

(57) ABSTRACT

A storage device, a controller, and a method for performing global wear-leveling may count write counts of a plurality of respective cores in each of a plurality of logical areas each including logical block address groups of the plurality of cores, determine, on the basis of degradation counts of the plurality of cores, a first core and a second core for which data swap is to be performed, determine a target logical area among the plurality of logical areas on the basis of a write count of the first core and a write count of the second core, and perform data swap between a first logical block address group of the first core included in the target logical area and a second logical block address group of the second core included in the target logical area.

13 Claims, 12 Drawing Sheets

FIG.5

CMI

| U | LBA | CORE |
|---|---|---|
| U1 | LBAGa | CORE1 |
| | LBAGd | CORE2 |
| | LBAGg | CORE3 |
| | LBAGj | CORE4 |
| U2 | LBAGb | CORE1 |
| | LBAGe | CORE2 |
| | LBAGh | CORE3 |
| | LBAGk | CORE4 |
| U3 | LBAGc | CORE1 |
| | LBAGf | CORE2 |
| | LBAGi | CORE3 |
| | LBAGl | CORE4 |
| ⋮ | ⋮ | ⋮ |

FIG.6

DCI

| CORE | DC |
|------|-----|
| CORE1 | 94 |
| CORE2 | 85 |
| CORE3 | 27 |
| CORE4 | 132 |

1st CORE ⟶ CORE3
2nd CORE ⟶ CORE4

FIG.9

| | WC_CORE1 | WC_CORE2 | WC_CORE3 | WC_CORE4 | WC_2nd CORE -WC_1st CORE |
|---|---|---|---|---|---|
| U1 | 841 | 376 | 262 | 170 | -92 |
| U2 | 765 | 127 | 946 | 321 | -625 |
| U3 | 1284 | 450 | 358 | 1420 | 1062 |
| U4 | 134 | 270 | 234 | 420 | 186 |
| U5 | 1714 | 1782 | 1765 | 1920 | 155 |
| U6 | 1425 | 1176 | 1337 | 1521 | -184 |
| U7 | 971 | 879 | 1901 | 270 | -1631 |
| U8 | 845 | 520 | 370 | 456 | -86 |
| ... | | | | | |

1st CORE → WC_CORE3
2nd CORE → WC_CORE4
TU → U3

STORAGE DEVICE, CONTROLLER AND METHOD FOR PERFORMING GLOBAL WEAR-LEVELING

CROSS-REFERENCE TO RELATED APPLICATION

The present application claims priority under 35 U.S.C. § 119(a) to Korean Patent Application No. 10-2022-0141239 filed in the Korean Intellectual Property Office on Oct. 28, 2022, which is incorporated herein by reference in its entirety.

BACKGROUND

1. Technical Field

Various embodiments generally relate to a storage device, a controller and a method for performing global wear-leveling.

2. Related Art

A storage device is a device that stores data on the basis of a request of a host such as a computer, a mobile terminal such as a smartphone or a tablet, or various other electronic devices.

The storage device may include a controller for controlling a memory (e.g., a volatile memory or a nonvolatile memory). The controller may receive a command from the host, and may execute or control an operation for reading, writing or erasing data with respect to the memory included in the storage device, on the basis of the received command.

The lifetime and performance of the entire storage device may be determined depending on the lifetime and performance of the memory included in the storage device. For example, if the lifetime and performance of the memory decrease, the lifetime and performance of the entire storage device may also decrease.

SUMMARY

Various embodiments are directed to a storage device, a controller and a method for performing global wear-leveling capable of extending the lifetime of a memory or preventing the performance of the memory from degrading.

Also, various embodiments are directed to a storage device, a controller and a method for performing global wear-leveling capable of reducing internal I/O when performing global wear-leveling.

In an embodiment, a storage device may include: a memory including a plurality of physical areas, and divided into a plurality of logical areas each including logical block address groups of a plurality of cores; and a controller including the plurality of cores that control the plurality of physical areas, respectively, and configured to count write counts of the plurality of respective cores in each logical area, determine, on the basis of degradation counts of the plurality of cores, a first core and a second core for which data swap is to be performed, determine a target logical area among the plurality of logical areas on the basis of a write count of the first core and a write count of the second core, and perform data swap between a first logical block address group of the first core included in the target logical area and a second logical block address group of the second core included in the target logical area.

In an embodiment, a controller may include: a plurality of cores configured to control a plurality of physical areas, respectively, included in a memory; and a host interface unit configured to count write counts of the plurality of respective cores in each of a plurality of logical areas each including logical block address groups of the plurality of cores, determine, on the basis of degradation counts of the plurality of cores, a first core and a second core for which data swap is to be performed, determine a target logical area among the plurality of logical areas on the basis of a write count of the first core and a write count of the second core, and change a core mapping between a first logical block address group of the first core of the target logical area and a second logical block address group of the second core of the target logical area.

In an embodiment, a method for operating a storage device may include: counting write counts of a plurality of respective cores in each of a plurality of logical areas that divide a memory; determining a first core with a smallest degradation degree and a second core with a greatest degradation degree, for which data swap is to be performed, among the plurality of cores on the basis of degradation counts of the plurality of cores; determining a target logical area in which, on the basis of a write count of the first core and a write count of the second core, a value obtained by subtracting the write count of the first core from the write count of the second core is maximum, among the plurality of logical areas; and performing data swap between a first logical address group of the first core of the target logical area and a second logical address group of the second core of the target logical area.

According to the embodiments of the disclosed technology, it is possible to extend the lifetime of a memory included in a storage device or prevent the performance of the memory from degrading, and it is possible to reduce internal I/O to prevent performance from degrading due to the performance of global wear-leveling.

BRIEF DESCRIPTION OF THE DRAWINGS

FIG. 5 is a diagram illustrating an example of core mapping information according to an embodiment of the disclosure.

FIG. 6 is a diagram illustrating degradation counts for a plurality of cores according to an embodiment of the disclosure.

FIG. 9 is a diagram illustrating an example of write counts of a plurality of cores for a plurality of logical areas according to an embodiment of the disclosure.

DETAILED DESCRIPTION

Hereinafter, embodiments of the present disclosure will be described in detail with reference to the accompanying drawings.

Figure 1:
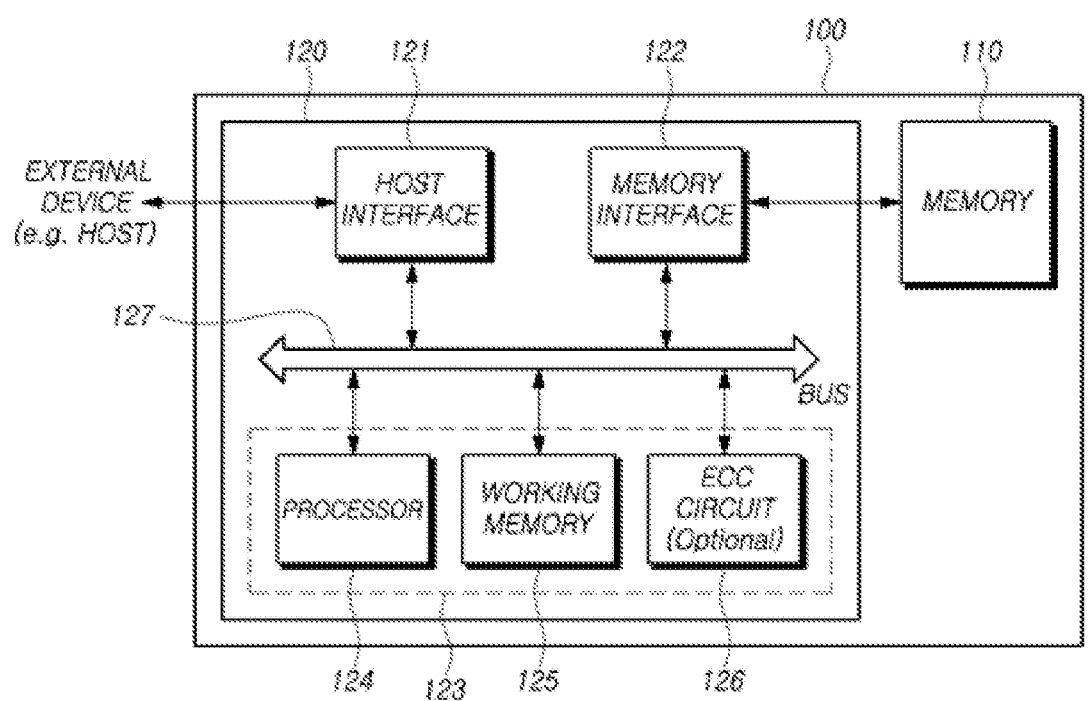
FIG. 1 is a schematic configuration diagram of a storage device according to an embodiment of the disclosure.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells"), which store data. Such a memory cell array may exist in a memory block.

For example, the memory 110 may be implemented into various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (SU-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area that is selected by the address in the memory cell array. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear-leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) traveling on land or water or in air under human control or traveling autonomously, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be implemented by being integrated into one device. Hereafter, for the sake of convenience in explanation, embodiments will be described with the controller 120 and the host separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, embodiments of an operation of the storage device 100 will be described as implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is not loaded in the working memory 125, the processor 124 may generate an event (e.g., an interrupt) for loading the corresponding part of the firmware in the working memory 125.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data that are necessary to drive the controller 120. A working memory 125 may be, for example, a volatile memory that includes at least one among an SRAM (static RAM), a DRAM (dynamic RAM) and an SDRAM (synchronous DRAM).

The error detection and correction circuit 126 may detect an error bit of target data and correct the detected error bit by using an error correction code. The target data may be, for example, data stored in the working memory 125 or data read from the memory 110.

The error detection and correction circuit 126 may be implemented to decode data by using an error correction code. The error detection and correction circuit 126 may be implemented by various code decoders. For example, a decoder that performs unsystematic code decoding or a decoder that performs systematic code decoding may be used.

For example, the error detection and correction circuit 126 may detect an error bit by the unit of a set sector in each of read data. Each read data may be constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not by units of sectors. For example, when a bit error rate (BER) is higher than a set reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect an uncorrectable sector. There may be one or more sectors that are determined to be uncorrectable. The error detection and correction circuit 126 may transfer information (for example, address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In other embodiments, one or more other components may be added in addition to the above-described components 121, 122, 124, 125 and 126 of the controller 120.

Hereinbelow, the memory 110 will be described in further detail with reference to FIG. 2.

Figure 2:
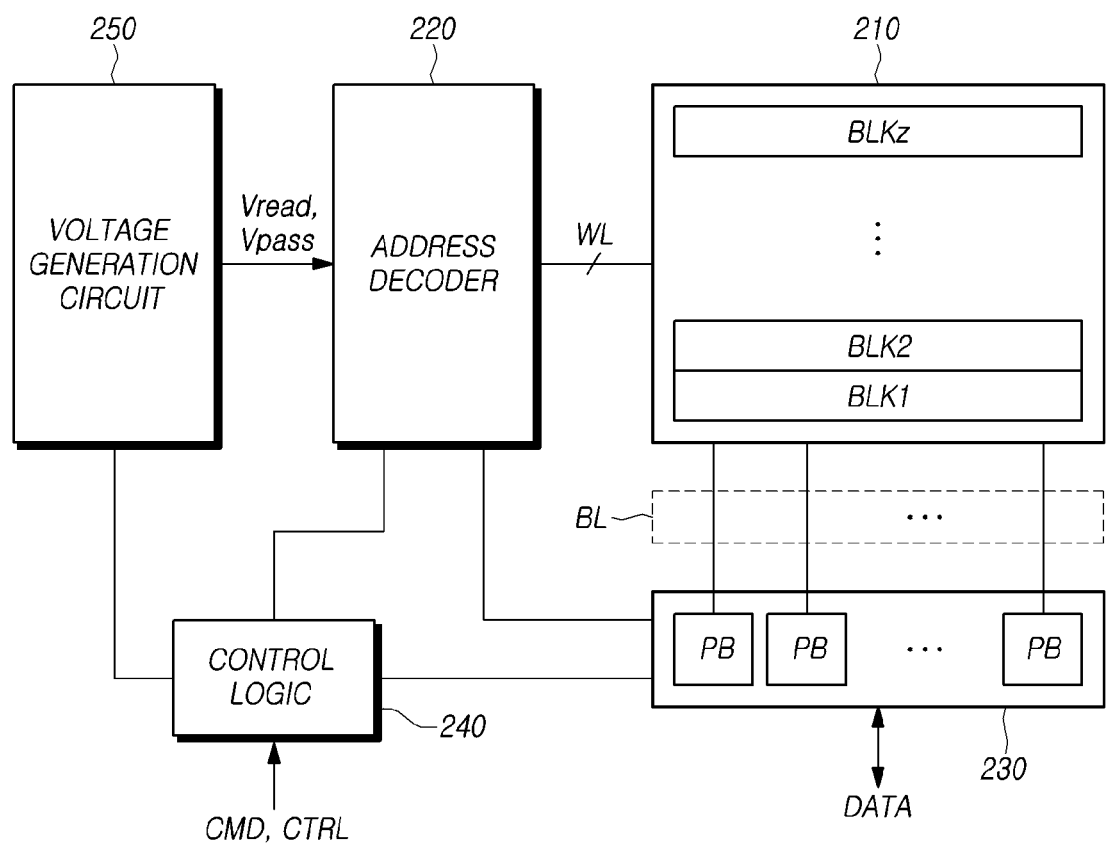
FIG. 2 is a block diagram schematically illustrating a memory of FIG. 1.

FIG. 2 is a diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and writhe circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, in a read voltage applying operation, the address decoder 220 may apply the read voltage Vread to a selected word line WL in a selected memory block, and may apply the pass voltage Vpass to the remaining unselected word lines WL.

In a program verify operation, the address decoder 220 may apply a verify voltage generated in the voltage generation circuit 250 to a selected word line WL in a selected memory block, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL.

The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
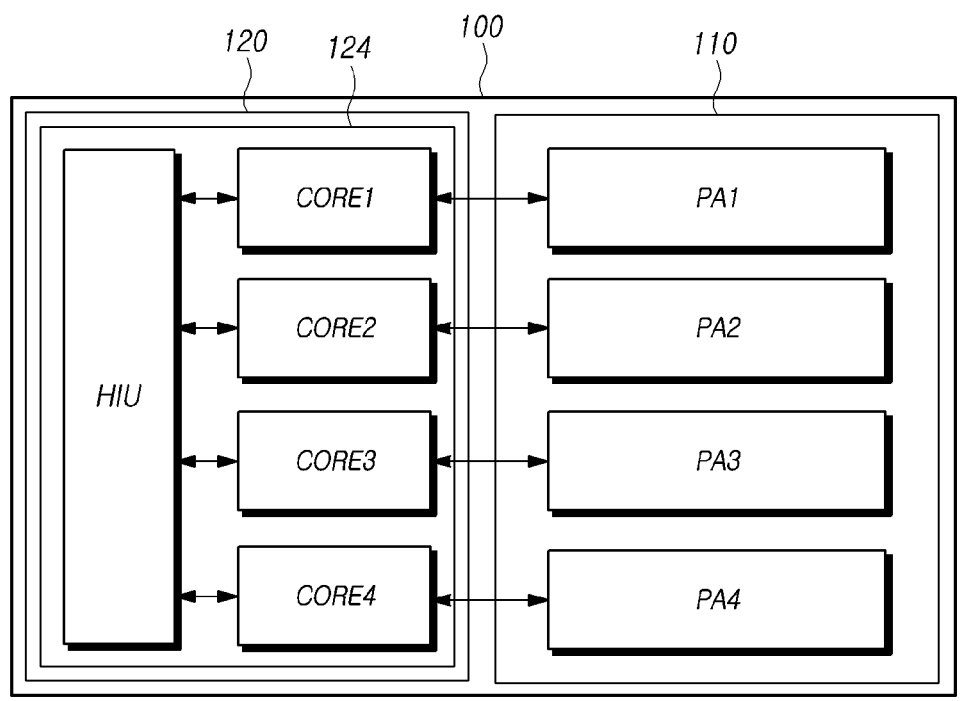
FIG. 3 is a diagram illustrating a host interface unit, a plurality of cores and a plurality of physical areas according to an embodiment of the disclosure.

FIG. 3 is a diagram illustrating a host interface unit, a plurality of cores and a plurality of physical areas according to an embodiment of the disclosure.

Referring to FIG. 3, a memory 110 of a storage device 100 may include a plurality of physical areas PA1, PA2, PA3 and PA4. The plurality of physical areas PA1, PA2, PA3 and PA4 are independent storage spaces, and may be accessed in parallel. Each of the plurality of physical areas PA1, PA2, PA3 and PA4 may include at least one memory chip. Each memory chip may include a plurality of memory blocks.

The controller 120 may include a plurality of cores CORE1, CORE2, CORE3 and CORE4 and a host interface unit HIU.

The plurality of cores CORE1, CORE2, CORE3 and CORE4 included in the controller 120 may control the plurality of physical areas PA1, PA2, PA3 and PA4 included in the memory 110. That is to say, the core 1 CORE1 may control the physical area 1 PA1 to write data to the physical area 1 PA1 or to read data stored in the physical area 1 PA1, and the core 2 CORE2 may control the physical area 2 PA2 to write data to the physical area 2 PA2 or to read data stored in the physical area 2 PA2. The plurality of cores CORE1, CORE2, CORE3 and CORE4 may access the memory 110 in parallel, and in this way, I/O performance of the storage device 100 may be increased.

The host interface unit HIU may decode a command transmitted from an external device to the storage device 100, and may transfer the decoded command to at least one core among the plurality of cores CORE1, CORE2, CORE3 and CORE4.

Each of the plurality of cores CORE1, CORE2, CORE3 and CORE4 may be a component of a processor 124, which executes the flash translation layer (FTL) performing a translation function between a logical address and a physical address in the firmware loaded in a working memory 125 (see, e.g., working memory 125 in FIG. 1). Each of the plurality of cores CORE1, CORE2, CORE3 and CORE4 may execute an independent flash translation layer (FTL). The host interface unit HIU may be a component of the processor 124, which executes the host interface layer (HIL) in the firmware loaded in the working memory 125.

The host interface unit HIU may request, on the basis of a command received from the external device, each of the plurality of cores CORE1, CORE2, CORE3 and CORE4 to write data or read data.

For example, when the storage device 100 receives a read command from the external device, the host interface unit HIU may identify a core CORE mapped to a logical block address (LBA) indicated by the read command, and may request the corresponding core CORE to read and return data written to a physical area PA. The core CORE may read data stored in a physical block address (PBA) of the physical area PA by referring to a mapping table between the logical block address (LBA) and the physical block address (PBA), and may return the read data to the host interface unit HIU. The host interface unit HIU may control a host interface 121 (see, e.g., host interface 121 in FIG. 1) to transmit the read data, returned from the core CORE, to the external device.

In another example, when the storage device 100 receives a write command from the external device, the host interface unit HIU may identify a core CORE mapped to a logical block address (LBA) indicated by the write command, and may request the corresponding core CORE to write data to a physical area PA controlled by the corresponding core CORE. The core CORE may write data to the physical area PA controlled by the core CORE, and may update a mapping table between the logical block address (LBA) and a physical block address (PBA).

When receiving a write command from the external device, the host interface unit HIU may count write counts of the plurality of respective cores in each logical area. In other words, after receiving a write command from the external device and identifying a core CORE mapped to a logical block address (LBA) indicated by the write command, the host interface unit HIU may increase the write count of the corresponding core CORE in a logical area (U) to which the corresponding logical block address (LBA) belongs.

Each of the plurality of cores CORE1, CORE2, CORE3 and CORE4 may access a physical area PA of the memory 110 through the flash interface layer (FIL).

The plurality of cores CORE1, CORE2, CORE3 and CORE4 and the plurality of physical areas PA1, PA2, PA3 and PA4 in FIG. 3 are used for the purpose of illustration. In other embodiments, the number of cores and the number of physical areas may be implemented in various ways and may number two or more.

Figure 4:
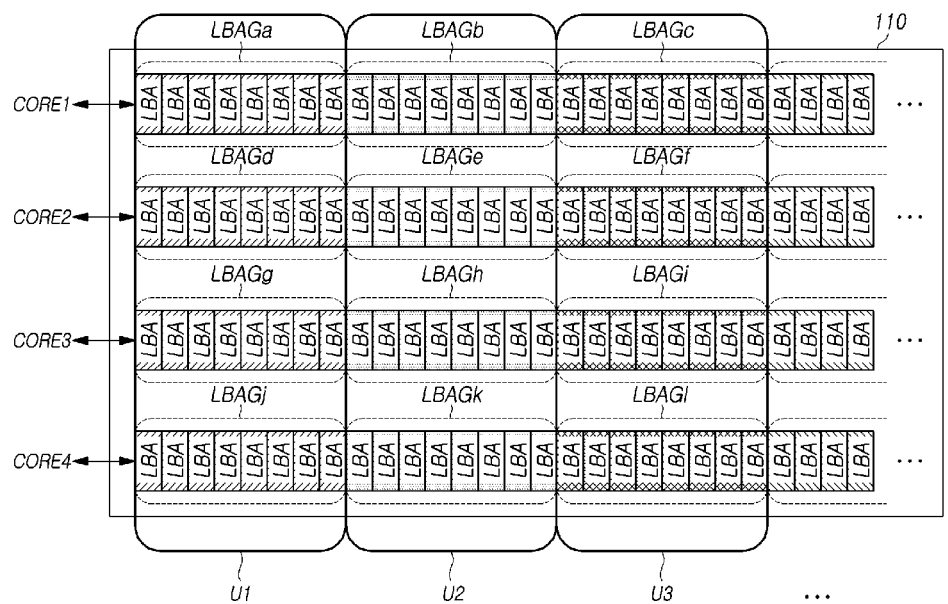
FIG. 4 is a diagram illustrating an example of a plurality of logical areas according to an embodiment of the disclosure.

FIG. 4 is a diagram illustrating an example of a plurality of logical areas according to an embodiment of the disclosure.

Referring to FIG. 4, a plurality of logical block addresses LBA may be allocated to each of the plurality of cores CORE1, CORE2, CORE3 and COR4, and logical block addresses LBA of a predetermined size may be grouped as a logical block address group LBAG in each core CORE. The memory 110 may be divided into a plurality of logical areas U1, U2, U3, . . . each including logical block address groups LBAG allocated to the plurality of respective cores CORE1, CORE2, CORE3 and COR4.

A logical area 1 U1 may include a logical block address group a LBAGa corresponding to the core 1 CORE1, a logical block address group d LBAGd corresponding to the core 2 CORE2, a logical block address group g LBAGg corresponding to the core 3 CORE3 and a logical block address group j LBAGj corresponding to the core 4 CORE4.

In the same manner, a logical area 2 U2 may include a logical block address group b LBAGb corresponding to the core 1 CORE1, a logical block address group e LBAGe corresponding to the core 2 CORE2, a logical block address group h LBAGh corresponding to the core 3 CORE3 and a logical block address group k LBAGk corresponding to the core 4 CORE4.

As illustrated, a logical area U may include logical block address groups LBAG of the same predetermined size that are allocated respectively to the plurality of cores CORE1, CORE2, CORE3 and CORE4.

FIG. 5 is a diagram illustrating an example of core mapping information according to an embodiment of the disclosure.

Referring to FIGS. 4 and 5, core mapping information CMI may indicate mapping relationships between logical block addresses LBA and the plurality of cores CORE1, CORE2, CORE3 and CORE4 for each logical area U.

Each logical area U may include a plurality of logical block address groups LBAG. For example, the logical area 1 U1 may include the logical block address group a LBAGa, the logical block address group d LBAGd, the logical block address group g LBAGg and the logical block address group j LBAGj. The plurality of cores CORE1, CORE2, CORE3 and CORE4 may be mapped respectively to the logical block address groups LBAG, respectively, included in the logical area 1 U1.

For example, in the logical area 1 U1, the core 1 CORE1 may be mapped to the logical block address group a LBAGa, the core 2 CORE2 may be mapped to the logical block address group d LBAGd, the core 3 CORE3 may be mapped to the logical block address group g LBAGg, and the core 4 CORE4 may be mapped to the logical block address group j LBAGj.

In the logical area 2 U2, the core 1 CORE1, the core 2 CORE2, the core 3 CORE3 and the core 4 CORE4 may be mapped to the logical block address group b LBAGb, the logical block address group e LBAGe, the logical block address group h LBAGh and the logical block address group k LBAGk, respectively.

The host interface unit HIU may change the mapping relationship of a core CORE to logical block addresses LBA in each logical area U, and may change the core mapping information CMI according to the change in the mapping relationship.

For example, according to the illustration of FIG. 5, the core 3 CORE3 is mapped to the logical block address group i LBAGi included in the logical area 3 U3, and the core 4 CORE4 is mapped to the logical block address group I LBAGI. The host interface unit HIU may map the core 4 CORE4 to the logical block address group i LBAGi and map the core 3 CORE3 to the logical block address group I LBAGI, thereby changing mapping relationships between logical block addresses LBA and cores CORE within the logical area U3. When mapping relationships between logical block addresses LBA and the plurality of cores CORE1, CORE2, CORE3 and CORE4 in each logical area U are changed, the host interface unit HIU may update the core mapping information CMI.

FIG. 6 is a diagram illustrating degradation counts for a plurality of cores according to an embodiment of the disclosure.

Referring to FIG. 6, a host interface unit HIU included in a controller 120 may count degradation counts DC of a plurality of cores CORE1, CORE2, CORE3 and CORE4, and may determine, on the basis of the degradation counts DC, a first core and a second core for which data swap is to be performed.

A degradation count DC is a parameter that indicates the degree of degradation of a physical area PA controlled by a core CORE. If the degradation count DC of the core CORE is high, then the extent of degradation of the physical area PA controlled by the core CORE is large.

A degradation count DC may be one of an erase count, a write count, a read count, a bad block occurrence count and a read error occurrence count.

For example, when the degradation count DC is an erase count, an erase operation may be performed by the unit of a memory block as described above with reference to FIG. 2. When an erase operation is performed on one of the plurality of memory blocks included in a physical area 1 PA1 of a memory 110, the host interface unit HIU may increase a degradation count DC corresponding to the core 1 CORE1, which controls the physical area 1 PA1. In the same manner, when an erase operation is performed on one of the plurality of memory blocks included in a physical area 2 PA2, the host interface unit HIU may increase a degradation count DC corresponding to the core 2 CORE2, which controls the physical area 2 PA2.

In order to extend the lifetime of the storage device 100 and prevent the performance of the storage device 100 from degrading, the host interface unit HIU may perform global wear-leveling to spread out the degradation of a physical area PA controlled by a specific core CORE. The host interface unit HIU may perform data swaps between some cores CORE among the plurality of cores CORE1, CORE2, CORE3 and CORE4 as measures for global wear-leveling.

The host interface unit HIU may identify a core CORE whose degradation count DC is smallest and a core CORE whose degradation count DC is greatest, and on that basis determine whether to perform a data swap. For example, when the difference in degradation count DC between a core CORE whose degradation count DC is smallest and a core CORE whose degradation count DC is largest is greater than a threshold count, the host interface unit HIU may control the cores CORE to perform data swap.

The host interface unit HIU may monitor degradation counts DC of the plurality of cores CORE1, CORE2, CORE3 and CORE4 according to a set period. When, in each set period, the difference in degradation count DC between a core CORE whose degradation count DC is smallest and a core CORE whose degradation count DC is greatest is equal to or greater than the threshold count, the host interface unit HIU may control the cores CORE to perform data swaps.

As between cores CORE identified to perform a data swap, the host interface unit HIU may designate the core CORE with the lowest degradation count DC as a first core 1st CORE, and may designate a core CORE whose degradation count DC is greatest as a second core 2nd CORE.

The host interface unit HIU may perform global wear-leveling by swapping data of the first core 1st CORE and data of the second core 2nd CORE. Global wear-leveling may be performed in such a way to swap all data stored in a physical area PA controlled by the first core 1st CORE and all data stored in a physical area PA controlled by the second core 2nd CORE. Global wear-leveling may also be performed in such a way to swap some data stored in the physical area PA controlled by the first core 1st CORE and some data stored in the physical area PA controlled by the second core 2nd CORE.

When global wear-leveling is performed in such a way to swap all data of the physical areas PA controlled by the first core 1st CORE and the second core 2nd CORE, an internal I/O of the storage device 100 for performing the global wear-leveling markedly increases, and thus, the performance of the storage device 100 may degrade. In addition, degradation of the physical areas PA may also occur due to the internal I/O. On the other hand, when global wear-leveling is performed to swap only some data of the physical areas PA controlled by the first core 1st CORE and the second core 2nd CORE, the degrading effects of the global wear-leveling may decrease.

The host interface unit HIU may determine data to be swapped when performing global wear-leveling, on the basis of write counts (WC) of a plurality of cores. It is therefore possible to reduce internal I/O by implementing global wear-leveling in a manner that swaps only some of the data of the physical areas PA controlled by the first core 1st CORE and the second core 2nd CORE, compared to swapping all of the data of the physical areas PA controlled by the first core 1st CORE and the second core 2nd CORE, which increases a degradation-leveling effect.

Figure 7:
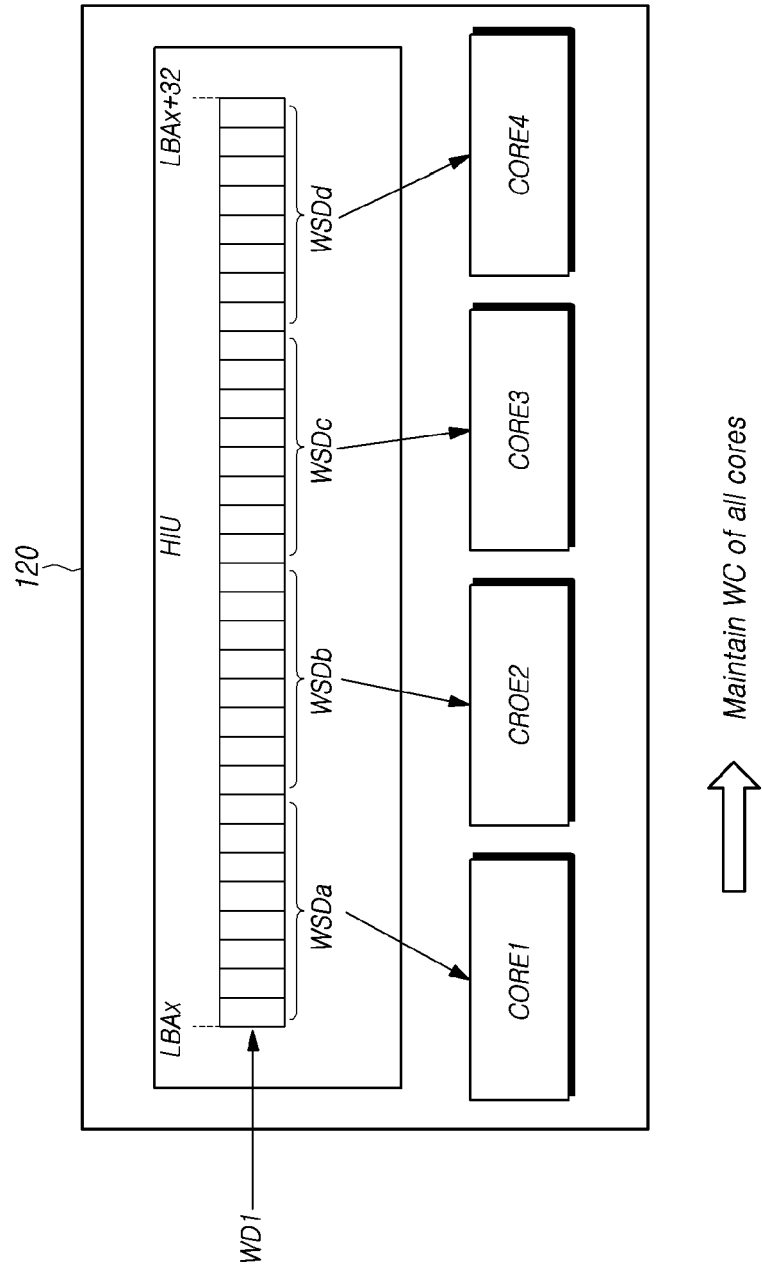
FIG. 7 is a diagram illustrating an example in which a host interface unit allocates write data to a plurality of cores according to an embodiment of the disclosure.

FIG. 7 is a diagram illustrating an example in which a host interface unit allocates write data to a plurality of cores according to an embodiment of the disclosure.

Figure 8:
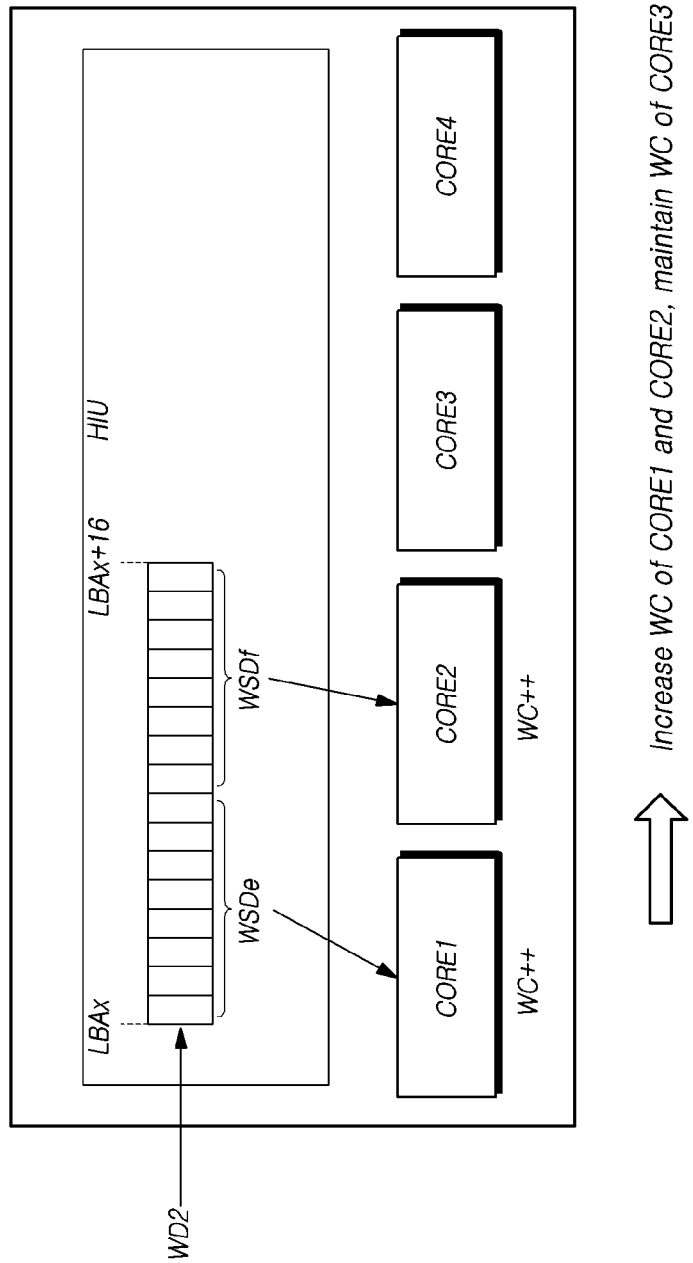
FIG. 8 is a diagram illustrating another example in which a host interface unit allocates write data to a plurality of cores according to an embodiment of the disclosure.

FIG. 8 is a diagram illustrating another example in which a host interface unit allocates write data to a plurality of cores according to an embodiment of the disclosure.

Referring to FIGS. 7 and 8, a host interface unit HIU included in a controller 120 may divide write data WD received from an external device by a set slicing size, and may allocate the divided write data WSD to one or more cores among the plurality of cores CORE1, CORE2, CORE3 and CORE4.

When the divided write data WSD is allocated to all of the plurality of cores CORE1, CORE2, CORE3 and CORE4, the host interface unit HIU included in the controller 120 may maintain write counts WC of all of the plurality of cores CORE1, CORE2, CORE3 and CORE4, and when the divided write data WSD is allocated to only some, but not all, of the plurality of cores CORE1, CORE2, CORE3 and CORE4, the host interface unit HIU included in the controller 120 may increase write counts WC of cores CORE to which the divided write data WSD is allocated.

Assuming that write data 1 WD1 corresponds to the size of 32 logical block addresses LBA, write data 2 WD2 corresponds to the size of 16 logical block addresses LBA, and the set slicing size corresponds to eight logical block addresses LBA.

Referring to FIG. 7, the host interface unit HIU may receive the write data 1 WD1 from the external device. The host interface unit HIU may divide the write data 1 WD1 by the set slicing size.

The host interface unit HIU may allocate write data WSDa, WSDb, WSDc and WSDd, divided in size into eight logical block addresses LBA, to the cores CORE1, CORE2, CORE3 and CORE4, respectively. Since the divided write data WSDa, WSDb, WSDc and WSDd are fully allocated to all cores, it may be regarded that the write data 1 WD1 has caused uniform degradation to all of the physical areas PA1, PA2, PA3 and PA4 controlled by the plurality of cores CORE1, CORE2, CORE3 and CORE4. Since global wear-leveling determines degradation of the respective physical areas PA1, PA2, PA3 and PA4 controlled by the plurality of cores CORE1, CORE2, CORE3 and CORE4, the host interface unit HIU may determine that the write data 1 WD1 has caused uniform degradation to all of the physical areas PA1, PA2, PA3 and PA4 controlled by the plurality of cores CORE1, CORE2, CORE3 and CORE4, and thus, the hose interface unit HIU maintains but does not increment the write counts WC.

Referring to FIG. 8, in another embodiment a host interface unit HIU may receive a write data 2 WD2 from an external device. The host interface unit HIU may divide the write data 2 WD2 by the set slicing size.

The host interface unit HIU may allocate write data WSDe and WSDf, divided in size into eight logical block addresses LBA, only to the core 1 CORE1 and the core 2 CORE2 from among all of the cores CORE1, CORE2, CORE3 and CORE4. The write data 2 WD2 has caused degradation asymmetrically only to the physical area 1 PA1 and the physical area 2 PA2 controlled by the core 1 CORE1 and the core 2 CORE2. Because the write data 2 WD2 has caused non-uniform degradation by writing only to some of the physical areas PA, the host interface unit HIU may increase the write counts WC of the core 1 CORE1 and the core 2 CORE2. The write counts WC of the core 3 CORE3 and the core 4 CORE4, to which the divided write data WSDe and WSDf of the write data 2 WD2 are not allocated, may be maintained and not incremented.

Meanwhile, write counts WC may be counted in each logical area U.

FIG. 9 is a diagram illustrating an example of write counts of a plurality of cores for a plurality of logical areas according to an embodiment of the disclosure.

Referring to FIG. 9, a host interface unit HIU may select a target logical area TU from among the plurality of logical areas U1, U2, U3, . . . U8 after determining a write count WC_1st CORE of the first core 1st CORE and a write count WC_2nd CORE of the second core 2nd CORE.

In a logical area U in which a core CORE has a high write count WC, it may be expected that write data will be allocated to the core CORE with a high frequency in the future. Similarly, in a logical area U in which a core CORE has a low write count WC, it may be expected that write data will be allocated to the core CORE with a low frequency in the future. Write data allocated to a certain core CORE with a high frequency means that a plurality of operations likely to cause degradation of the memory 110, including an erase operation, will be performed on a physical area PA controlled by the core CORE. Conversely, write data allocated to a certain core CORE with a low frequency means that relatively few operations likely to cause degradation of the memory 110, including an erase operation, will be performed on a physical area PA controlled by the core CORE.

The target logical area TU may be determined as a logical area U in which a value obtained by subtracting the write count WC_1st CORE of the first core 1st CORE from the write count WC_2nd CORE of the second core 2nd CORE is the greatest among the plurality of logical areas U.

As described above with reference to FIG. 6, the first core 1st CORE, with the lowest degradation count DC, is a core CORE that controls a physical area PA whose degradation has least progressed. The second core 2nd CORE, with the highest degradation count DC, is a core CORE that controls a physical area PA whose degradation has most progressed.

A logical area U, in which a difference value obtained by subtracting the write count WC_1st CORE of the first core 1st CORE from the write count WC_2nd CORE of the second core 2nd CORE is greatest among the plurality of logical areas, may have the greatest difference between the degradation level of a physical area PA controlled by the second core 2nd CORE and the degradation level of a physical area PA controlled by the first core 1st CORE.

In FIG. 9, core 3 is a core CORE whose degradation count DC is smallest, so core 3 is determined as the first core 1st CORE. Core 4 CORE4 is a core CORE whose degradation count DC is greatest, so core 4 is determined as the second core 2nd CORE.

In the logical area 3 U3, a write count WC_CORE3 of the core 3 CORE3 corresponding to the first core 1st CORE is 358, and a write count WC_CORE4 of the core 4 CORE4 corresponding to the second core 2nd CORE is 1420. A value obtained by subtracting the write count WC_1st CORE of the first core 1st CORE from the write count WC_2nd CORE of the second core 2nd CORE is 1062, which is greater than values of the other logical areas U.

In the logical area 7 U7, a value obtained by subtracting 1901 as the write count WC_1st CORE of the first core 1st CORE from 270 as the write count WC_2nd CORE of the second core 2nd CORE is −1631, which is a greatest absolute value from among values of the plurality of logical areas U. However, in the logical area 7 U7, the physical area PA4 controlled by the core 4 CORE4 serves as a factor that increases the degradation of the physical area PA3 controlled by the core 3 CORE3. If data swap is performed by determining the logical area 7 U7 as the target logical area TU, when considering the pattern of write data received after the data swap, the degradation of the physical area PA4 controlled by the core 4 CORE4 may be further intensified compared to the degradation of the physical area PA3 controlled by the core 3 CORE3. Therefore, when performing global wear-leveling, it may be inappropriate to select the logical area 7 U7 having a greatest absolute value, but also negative value, as the target logical area TU for performing data swap.

The logical area 3 U3, in which a value obtained by subtracting the write count WC_1st CORE of the first core 1st CORE from the write count WC_2nd CORE of the second core 2nd CORE is greatest as 1062, may be determined as the target logical area TU. The host interface unit HIU may control the core 3 CORE3 and the core 4 CORE4 to perform data swap on the logical area 3 U3.

Figure 10:
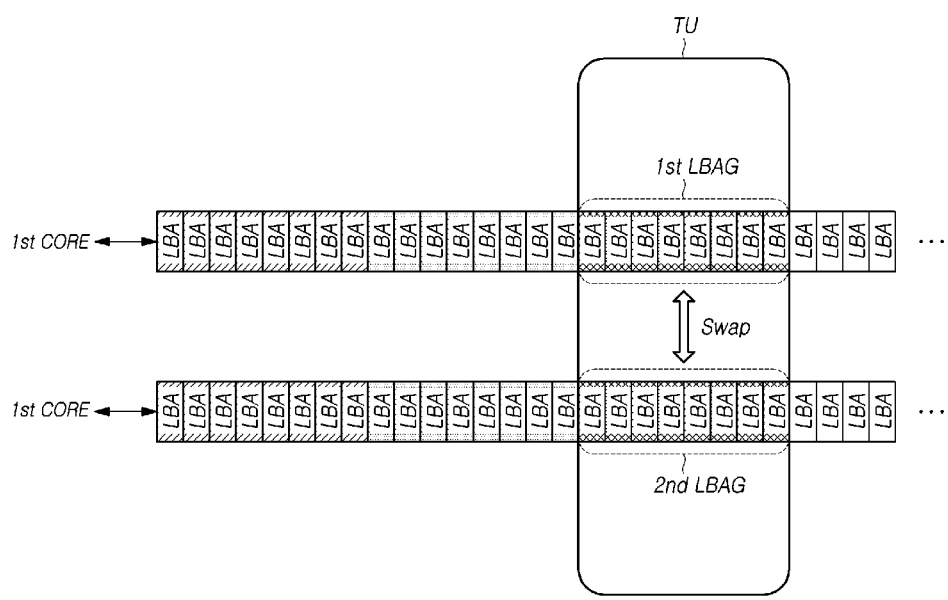
FIG. 10 is a diagram illustrating a data swap according to an embodiment of the disclosure.

FIG. 10 is a diagram illustrating a data swap according to an embodiment of the disclosure.

Referring to FIG. 10, a host interface unit HIU included in a controller 120 may perform a data swap between a first logical address group 1st LBAG of a first core 1st CORE of a target logical area TU and a second logical address group 2nd LBAG of a second core 2nd CORE of the target logical area TU.

As described above with reference to FIG. 9, the target logical area TU is a logical area U in which the degradation of the second core 2nd CORE is increased compared to the degradation of the first core 1st CORE. As data of the first logical block address group 1st LBAG mapped to the first core 1st CORE and data of the second logical block address group 2nd LBAG mapped to the second core 2nd CORE are swapped, the data previously accessed through the second core 2nd CORE is accessed through the first core 1st CORE after the data swap. The data previously accessed through the first core 1st CORE is accessed through the second core 2nd CORE after the data swap. In this manner, it is possible to level degradation degrees of physical areas PA included in the memory 110.

In order for the data swap to occur, the host interface unit HIU may control the second core 2nd CORE to write data mapped to the first logical block address group 1st LBAG to a physical area PA controlled by the second core 2nd CORE. As the data is written to the physical area PA, the second core 2nd CORE may update a mapping table between logical block addresses LBA and physical block addresses (PBA) managed by the second core 2nd CORE.

Similarly, the host interface unit HIU may control the first core 1st CORE to write data, mapped to the second logical block address group 2nd LBAG before the data swap, to a physical area PA controlled by the first core 1st CORE. As the data is written to the physical area PA controlled by the first core 1st CORE, the first core 1st CORE may update a mapping table between logical block addresses LBA and physical block addresses (PBA) managed by the first core 1st CORE.

After performing the data swap, the host interface unit HIU may change mapping relationships between logical block addresses LBA and cores CORE by mapping the second core 2nd CORE to the first logical block address group 1st LBAG and mapping the first core 1st CORE to the second logical block address group 2nd LBAG. As the mapping relationships between the logical block addresses LBA of the target logical area TU and the cores CORE are changed, the host interface unit HIU may update the core mapping information CMI.

In accordance with the updated core mapping information CMI, the host interface unit HIU may allow the external device to access the first logical block address group 1st LBAG through the second core 2nd CORE when the external device accesses the first logical block address group 1st LBAG, and may allow the external device to access the second logical block address group 2nd LBAG through the first core 1st CORE when the external device accesses the second logical block address group 2nd LBAG.

The effect of global wear-leveling may be achieved even without swapping data of an entire physical area PA controlled by a core CORE. Also, by reducing internal I/O, the throughput of the processor 124 may be reduced. In addition, degradation of the memory 110 caused by global wear-leveling itself may be prevented.

Figure 11:
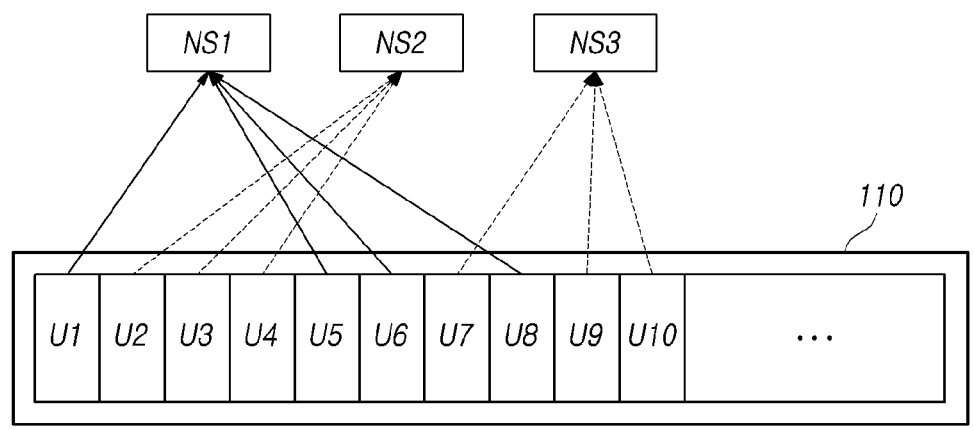
FIG. 11 is a diagram illustrating namespaces according to an embodiment of the disclosure.

FIG. 11 is a diagram illustrating namespaces according to an embodiment of the disclosure.

Referring to FIG. 11, a logical area U may be a unit by which a namespace is set.

Each namespace is a partial area obtained by dividing the entire area of a memory 110 and is a set of logical blocks. An external device may access a namespace by designating a namespace NS. The external device may request that a storage device 100 create or delete a namespace NS, and a controller 120 included in the storage device 100 may create a new namespace NS or delete an existing namespace NS according to the request received from the external device.

Due to repetitive creation and deletion of namespaces NS, fragmentation of logical block addresses LBA may occur. Such fragmentation of logical block addresses LBA may degrade the performance of the storage device 100, and may limit the setting of a new namespace NS.

When setting a namespace NS, if the controller 120 sets the namespace NS in a namespace granularity unit, the fragmentation of logical block addresses LBA may be prevented. A namespace granularity unit may be a set of a plurality of logical block addresses LBA. A logical area U including logical block address groups LBAG, each having a predetermined size, of a plurality of cores may correspond to the namespace granularity unit.

Referring to FIG. 11, a logical area 1 U1, a logical area 5 U5, a logical area 6 U6 and a logical area 8 U8 are allocated to a namespace 1 NS1, a logical area 2 U2, a logical area 3 U3 and a logical area 4 U4 are allocated to a namespace 2 NS2, and a logical area 7 U7, a logical area 9 U9 and a logical area 10 U10 are allocated to a namespace NS3.

When the namespace 1 NS1 is deleted, the logical area 1 U1, the logical area 5 U5, the logical area 6 U6 and the logical area 8 U8 may be deallocated. When another namespace NS is set, at least one logical area U among the logical area 1 U1, the logical area 5 U5, the logical area 6 U6 and the logical area 8 U8 may be allocated.

Figure 12:
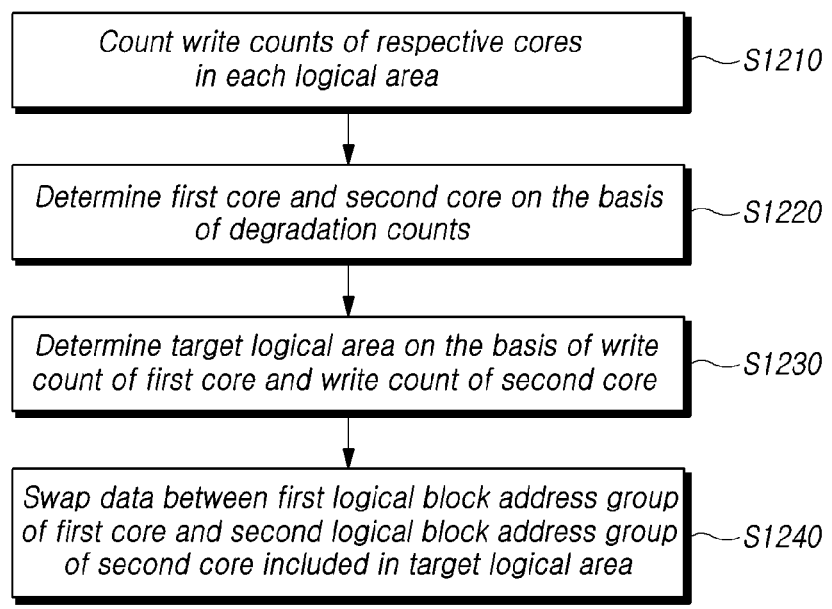
FIG. 12 is a diagram illustrating a method for operating a storage device according to an embodiment of the disclosure.

FIG. 12 is a diagram illustrating a method for operating a storage device according to an embodiment of the disclosure.

Referring to FIG. 12, a method for operating a storage device 100 may include counting write counts of a plurality of respective cores in each of a plurality of logical areas that divide a memory (S1210).

In the method for operating the storage device 100, the step S1210 of counting write counts of a plurality of respective cores in each of a plurality of logical areas that divide a memory may include receiving write data from an external device; dividing the write data by a set slicing size; allocating the divided write data to at least one core among the plurality of cores; maintaining write counts of all of the plurality of cores when the divided write data is allocated to all of the plurality of cores; and increasing write counts of cores to which the divided write data is allocated when the divided write data is allocated to some, but not all, of the plurality of cores.

The method for operating the storage device 100 may include determining, from among the plurality of cores, a first core with a smallest degree of degradation and a second core with a greatest degree of degradation for performing a data swap, on the basis of degradation counts of the plurality of cores (S1220).

The degradation degrees of the plurality of cores may be determined on the basis of degradation counts DC. A core with the lowest degradation count DC may be a core with the smallest degradation degree, and a core with the largest degradation count DC may be a core with a greatest degradation degree.

The method for operating the storage device 100 may include determining a target logical area in which, on the basis of a write count of the first core and a write count of the second core, a value obtained by subtracting the write count of the first core from the write count of the second core is the largest, from among the plurality of logical areas (S1230).

The method for operating the storage device 100 may include performing a data swap between a first logical address group of the first core of the target logical area and a second logical address group of the second core of the target logical area (S1240). In the method for operating the storage device 100, after the data swap is performed, a mapping table between logical block addresses LBA and physical block addresses (PBA) may be updated, and core mapping information between logical block addresses LBA and the plurality of cores CORE may be updated.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
    a memory including a plurality of physical areas, and divided into a plurality of logical areas each including logical block address groups of a plurality of cores; and
    a controller including the plurality of cores that control the plurality of physical areas, respectively, and configured to count write counts of the plurality of cores in each logical area, on the basis of degradation counts of the plurality of cores, select a first core and a second core for which data swap is to be performed, determine a target logical area among the plurality of logical areas on the basis of a write count of the first core and a write count of the second core, and perform data swap between a first logical block address group of the first core included in the target logical area and a second logical block address group of the second core included in the target logical area,
    wherein a difference between a write count of the first logical block address group and a write count of the second logical block address group is the greatest among differences between a first candidate logical block address group of the first core and a second candidate logical block address group of the second core, and the first candidate logical block address group and the second candidate logical block address group are included in a same logical area.

2. The storage device according to claim 1, wherein the controller divides write data received from an external device by a set slicing size, and allocates divided write data to at least one core among the plurality of cores.

3. The storage device according to claim 2, wherein the controller maintains write counts of all of the plurality of cores when the divided write data is allocated to all of the plurality of cores, and increases write counts of cores to which the divided write data is allocated when the divided write data is allocated to some of the plurality of cores.

4. The storage device according to claim 1, wherein the first core is a core with a smallest degradation count among the plurality of cores, and the second core is a core with a greatest degradation count among the plurality of cores.

5. The storage device according to claim 1, wherein the degradation count is one of an erase count, a write count, a read count, a bad block occurrence count, and a read error occurrence count.

6. The storage device according to claim 1, wherein, after performing the data swap, the controller maps the second core to the first logical block address group, and maps the first core to the second logical block address group.

7. The storage device according to claim 1, wherein the logical area is a unit by which a namespace is set.

8. A controller comprising:
   a plurality of cores configured to control a plurality of physical areas, respectively, included in a memory; and
   a host interface unit configured to count write counts of the plurality of cores in each of a plurality of logical areas each including logical block address groups of the plurality of cores, on the basis of degradation counts of the plurality of cores, select a first core and a second core for which data swap is to be performed, determine a target logical area among the plurality of logical areas on the basis of a write count of the first core and a write count of the second core, and change a core mapping between a first logical block address group of the first core of the target logical area and a second logical block address group of the second core of the target logical area,
   wherein a difference between a write count of the first logical block address group and a write count of the second logical block address group is the greatest among differences between a first candidate logical block address group of the first core and a second candidate logical block address group of the second core, and the first candidate logical block address group and the second candidate logical block address group are included in a same logical area.

9. The controller according to claim 8, wherein the host interface unit divides write data received from an external device by a set slicing size, and allocates divided write data to at least one core among the plurality of cores.

10. The controller according to claim 9, wherein the host interface unit maintains write counts of all of the plurality of cores when the divided write data is allocated to all of the plurality of cores, and increases write counts of cores to which the divided write data is allocated when the divided write data is allocated to some of the plurality of cores.

11. The controller according to claim 8, wherein the first core is a core with a smallest erase count among the plurality of cores, and the second core is a core with a greatest erase count among the plurality of cores.

12. A method for operating a storage device, comprising:
   counting write counts of a plurality of cores in each of a plurality of logical areas that divide a memory;
   determining a first core with a smallest degradation degree and a second core with a greatest degradation degree, for which data swap is to be performed, among the plurality of cores on the basis of degradation counts of the plurality of cores;
   determining a target logical area in which, on the basis of a write count of the first core and a write count of the second core, among the plurality of logical areas; and
   performing data swap between a first logical block address group of the first core of the target logical area and a second logical block address group of the second core of the target logical area,
   wherein a difference between a write count of the first logical block address group and a write count of the second logical block address group is the greatest among differences between a first candidate logical block address group of the first core and a second candidate logical block address group of the second core, and the first candidate logical block address group and the second candidate logical block address group are included in a same logical area.

13. The method according to claim 12, wherein the counting of the write counts of the plurality of cores in each of the plurality of logical areas comprises:
   receiving write data from an external device;
   dividing the write data by a set slicing size;
   allocating the divided write data to at least one core among the plurality of cores;
   maintaining write counts of all of the plurality of cores when the divided write data is allocated to all of the plurality of cores; and
   increasing write counts of cores to which the divided write data is allocated when the divided write data is allocated to some of the plurality of cores.

* * * * *